(12) United States Patent
Brooks et al.

(10) Patent No.: US 9,908,572 B2
(45) Date of Patent: Mar. 6, 2018

(54) TRACK ROLLER ASSEMBLY

(71) Applicant: Caterpillar Inc., Peoria, IL (US)

(72) Inventors: Jennifer A. Brooks, Peoria, IL (US);
Enrico Grandi, Bazzano (IT);
Maurizio Succi, Bazzano (IT); Roger L. Recker, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 124 days.

(21) Appl. No.: 14/864,519

(22) Filed: Sep. 24, 2015

(65) Prior Publication Data

US 2017/0088204 A1   Mar. 30, 2017

(51) Int. Cl.
| | | |
|---|---|---|
| *B62D 55/092* | (2006.01) | |
| *B62D 55/32* | (2006.01) | |
| *B62D 55/14* | (2006.01) | |
| *B62D 55/08* | (2006.01) | |
| *B62D 55/15* | (2006.01) | |

(52) U.S. Cl.
CPC ........... *B62D 55/092* (2013.01); *B62D 55/08* (2013.01); *B62D 55/14* (2013.01); *B62D 55/15* (2013.01); *B62D 55/32* (2013.01)

(58) Field of Classification Search
CPC ...... B62D 55/092; B62D 55/08; B62D 55/14; B62D 55/32
USPC ....... 305/117, 119, 124, 129, 142, 136, 137, 305/138
See application file for complete search history.

(56) References Cited

U.S. PATENT DOCUMENTS

| | | | | | |
|---|---|---|---|---|---|
| 2,179,875 | A | * | 11/1939 | Baker | B62D 55/15 384/368 |
| 2,614,006 | A | * | 10/1952 | Bechman | B62D 55/15 305/101 |
| 2,915,326 | A | * | 12/1959 | Mason | F16C 33/74 277/565 |
| 3,869,931 | A | * | 3/1975 | Boggs | B62D 55/145 305/119 |
| 4,176,887 | A | * | 12/1979 | Alpers | B62D 55/08 305/106 |

(Continued)

FOREIGN PATENT DOCUMENTS

| | | |
|---|---|---|
| JP | S4988428 | 7/1974 |
| JP | S51103243 | 8/1976 |

(Continued)

*Primary Examiner* — S. Joseph Morano
*Assistant Examiner* — Jean Charleston

(57) ABSTRACT

A track roller frame is provided for an endless track. The track roller frame includes a shaft including a body portion and a flange. A first bearing assembly rotatably supports a first rim portion on the shaft and a second bearing assembly rotatably supports a second rim portion on the shaft. Each of the first bearing assembly and the second bearing assembly includes a first leg that extends in the axial direction and is disposed along the body portion of the shaft and a second leg that extends in the radial direction and is disposed along the flange. A respective inner surface of each of the first rim portion and the second rim portion that faces the bearing assembly includes a plurality of lubricant pockets for receiving lubricant. Each of the lubricant pockets is configured and arranged such that lubricant contained therein is in fluid communication with the bearing assembly.

13 Claims, 6 Drawing Sheets

(56) References Cited

U.S. PATENT DOCUMENTS

| | | | |
|---|---|---|---|
| 4,427,311 A * | 1/1984 | Takenaka | F16C 13/006 |
| | | | 384/385 |
| 4,555,146 A * | 11/1985 | Tamura | B62D 55/08 |
| | | | 305/119 |
| 6,874,859 B1 | 4/2005 | Duse | |
| 7,374,257 B2 * | 5/2008 | Oertley | B62D 55/15 |
| | | | 305/136 |
| 8,770,677 B2 | 7/2014 | Yelistratov | |
| 2002/0153773 A1 | 10/2002 | Yoon | |
| 2014/0001828 A1 * | 1/2014 | Meyer | B62D 55/14 |
| | | | 305/137 |

FOREIGN PATENT DOCUMENTS

| | | |
|---|---|---|
| JP | 2008-213692 A | 9/2008 |
| WO | 0164503 | 7/2001 |

* cited by examiner

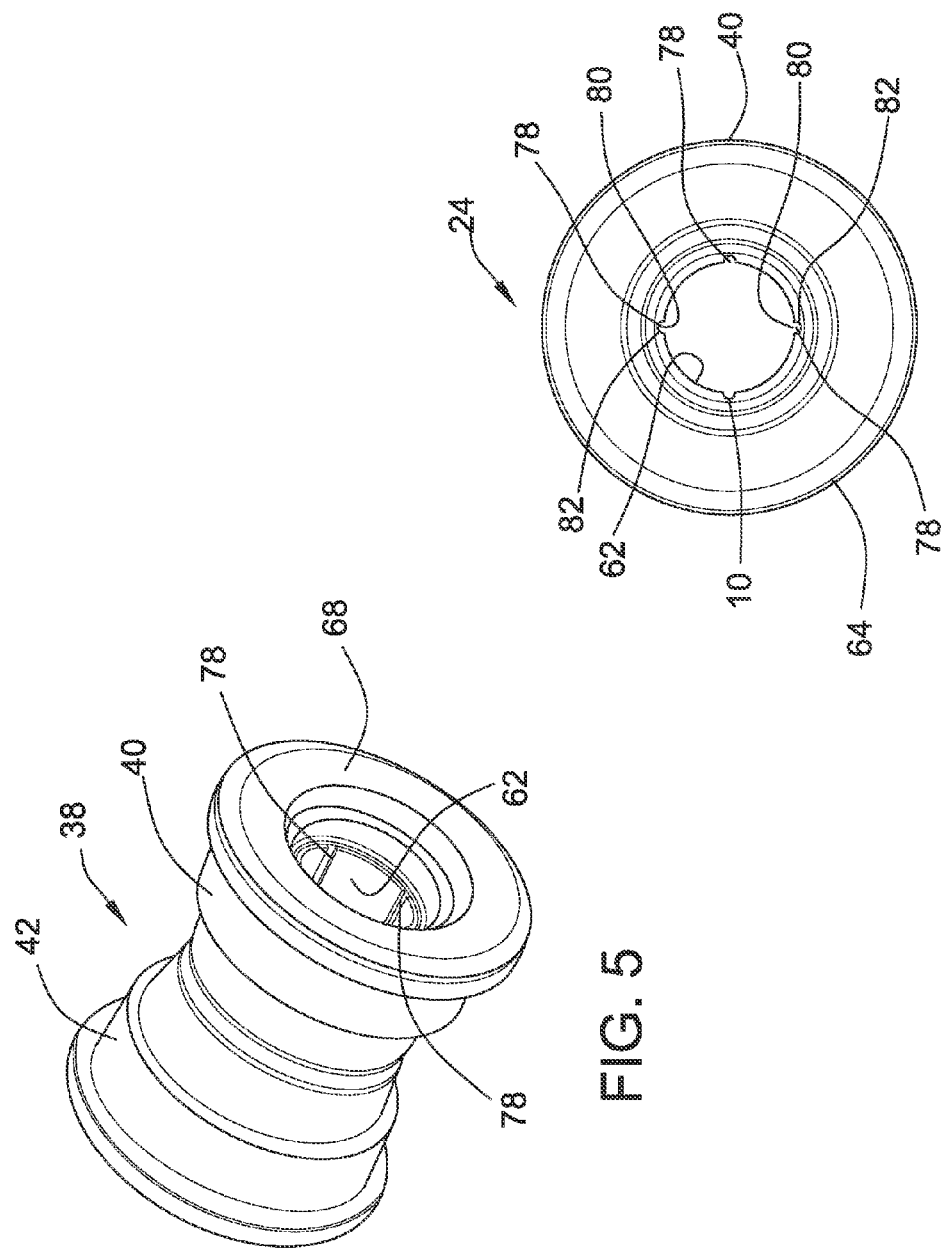

TRACK ROLLER ASSEMBLY

TECHNICAL FIELD

This disclosure relates generally to tracked undercarriages for machines, more particularly, to a track roller assembly for a tracked undercarriage.

BACKGROUND

Many track-type machines have tracked undercarriages that move along the ground as the machine travels. Examples of track-type machines with tracked undercarriages may include, but are not limited to, excavators, tractors, dozers, and the like. Generally, tracked undercarriages include an endless or continuous track driven around two or more wheels. An endless track can better distribute the force the track-type machine applies to the ground as a result of the large surface area of the track as compared to the wheels alone. This may allow a track-type machine with an endless track to traverse soft ground with a lower likelihood of becoming stuck, for example, due to sinking. In addition, endless tracks may also increase durability of the machine.

Endless tracks for track-type machines are typically made up of a loop of coupled metal links having outer sides that engage a work surface such as the ground, and inner sides traveling about rotating components. These rotating components can include various drive sprockets, tensioners, idlers and track rollers. The track rollers of a typical track-type work machine rotate passively against an inside of the track as it traverses the work surface. One example of such a track roller assembly is disclosed in U.S. Pat. No. 7,374,257 ("the '257 patent"). The track roller assembly disclosed in the '257 patent includes two rim portions that are supported on a shaft by a bearing assembly. The bearing assembly includes a pair of sleeves each arranged between a respective one of the rims and the shaft. Each sleeve is configured to rotate freely relative to both the shaft and the respective rim portion.

A common issue with track roller assemblies including the track roller assembly disclosed in the '257 patent is that the designs can be relatively expensive. For example, the material cost for the components of the track roller assemblies may be relatively high. Additionally, the track roller assemblies may be relatively difficult and time consuming, and therefore relatively expensive, to assemble.

SUMMARY

In one aspect, the disclosure describes a track roller assembly for an endless track. The disclosed track roller assembly includes a shaft including a body portion and a flange that extends in a radial direction away from the body portion. The shaft has a rotational axis that defines an axial direction. A first rim portion and a second rim portion are connected together. A first bearing assembly rotatably supports the first rim portion on the shaft and a second bearing assembly rotatably supports the second rim portion on the shaft. Each of the first bearing assembly and the second bearing assembly includes a first leg that extends in the axial direction and is disposed along the body portion of the shaft and a second leg that extends in the radial direction and is disposed along the flange. A respective inner surface of each of the first rim portion and the second rim portion that faces the bearing assembly includes a plurality of lubricant pockets for receiving lubricant. Each of the lubricant pockets is configured and arranged such that lubricant contained therein is in fluid communication with the bearing assembly.

In another aspect, the disclosure describes a track assembly. The disclosed track assembly includes a roller frame, an endless track and a track roller assembly supported on the track roller frame for guiding the endless track. The track roller assembly includes a shaft including a body portion and a flange that extends in a radial direction away from the body portion. The shaft has a rotational axis defining an axial direction A first rim portion and a second rim portion are connected together. A first bearing assembly rotatably supports the first rim portion on the shaft and a second bearing assembly rotatably supports the second rim portion on the shaft Each of the first bearing assembly and the second bearing assembly includes a first leg that extends in the axial direction and is disposed along the body portion of the shaft and a second leg that extends in the radial direction and is disposed along the flange. A respective inner surface of each of the first rim portion and the second rim portion that faces the bearing assembly includes a plurality of lubricant pockets for receiving lubricant. Each of the lubricant pockets is configured and arranged such that lubricant contained therein is in fluid communication with the bearing assembly.

In yet another aspect, the disclosure describes a method of assembling a track roller assembly. According to the described method a first bearing assembly is inserted into a first rim portion with a first leg of the first bearing assembly abutting an inner radial surface of the first rim portion and a second leg of the first bearing assembly abutting an inner axial surface of the first rim portion. The inner radial surface of the first rim portion includes a plurality of lubricant pockets for receiving lubricant with each of the lubricant pockets being configured and arranged such that lubricant contained therein is in fluid communication with the first bearing assembly. A second bearing assembly is inserted into a second rim portion with a first leg of the second bearing assembly abutting an inner radial surface of the second rim portion and a second leg of the second bearing assembly abutting an inner axial surface of the second rim portion. The inner radial surface of the second rim portion includes a plurality of lubricant pockets for receiving lubricant with each of the lubricant pockets being configured and arranged such that lubricant contained therein is in fluid communication with the second bearing assembly. A first end of a shaft is inserted into a first opening defined by the inner radial surface of the first rim portion until a flange on the shaft abuts against the second leg of the first bearing assembly. A second end of the shaft is inserted into a second opening defined by the inner radial surface of the second rim portion until the flange on the shaft abuts against the second leg of the second bearing assembly. The first rim portion and the second rim portion are welded together.

BRIEF DESCRIPTION OF THE DRAWINGS

FIG. 5 is an isometric view of assembled first and second rim portions of the track roller assembly of FIG. 3.

FIG. 6 is an end view of the assembled first and second rim portions of FIG. 5.

DETAILED DESCRIPTION

Figure 1:
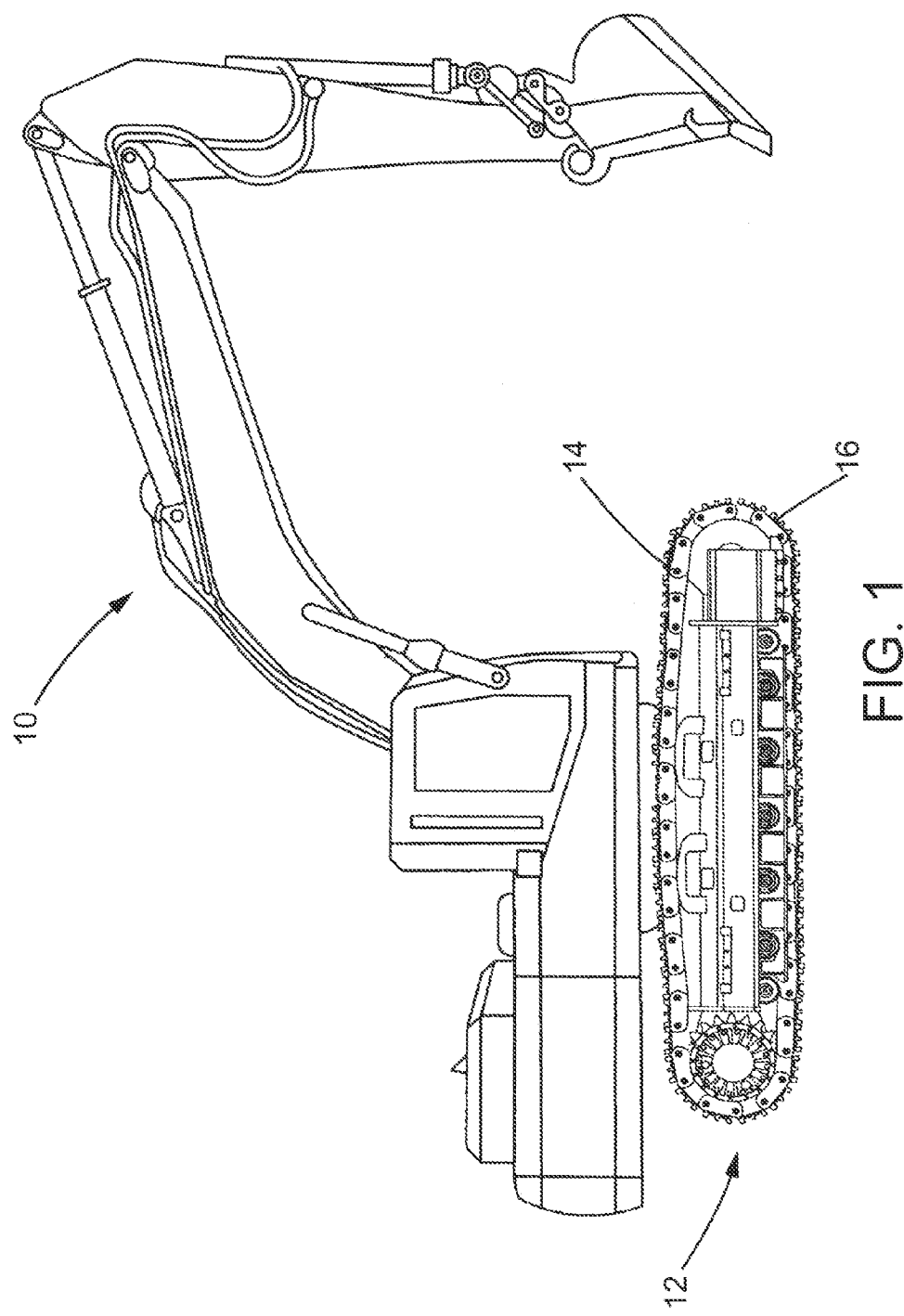
FIG. 1 is a side view of an exemplary machine including a track assembly with a track roller assembly according to the present disclosure.

This disclosure generally relates to track assemblies for machines and, more particularly to a track roller assembly for such a track assembly. Referring to FIG. 1 of the drawings, a machine 10 is shown that includes an undercarriage 12 with a track assembly 14 having an endless track 16, consistent with the present disclosure. While only a single track assembly 14 is shown in FIG. 1, it will be understood that a second track assembly 14 may be provided on the side of the machine 10 opposite the side that is shown in FIG. 1. Although the machine 10 is illustrated as an excavator, the machine 10 may be of any other type that includes an endless track 16. Thus, as used herein, the term "machine" refers to a mobile track-type machine that performs a driven operation involving physical movement associated with a particular industry, such as earthmoving, construction, landscaping, forestry, and agriculture. Examples of machines to which the present disclosure is applicable include earthmoving vehicles, excavators, tractors, dozers, loaders, backhoes, agricultural equipment, material handling equipment, and other types of machines that operate in a work environment. The machine 10 of FIG. 1 is shown primarily for illustrative purposes to assist in disclosing features of the present disclosure and accordingly FIG. 1 does not depict all of the components associated with the machine 10.

Figure 2:
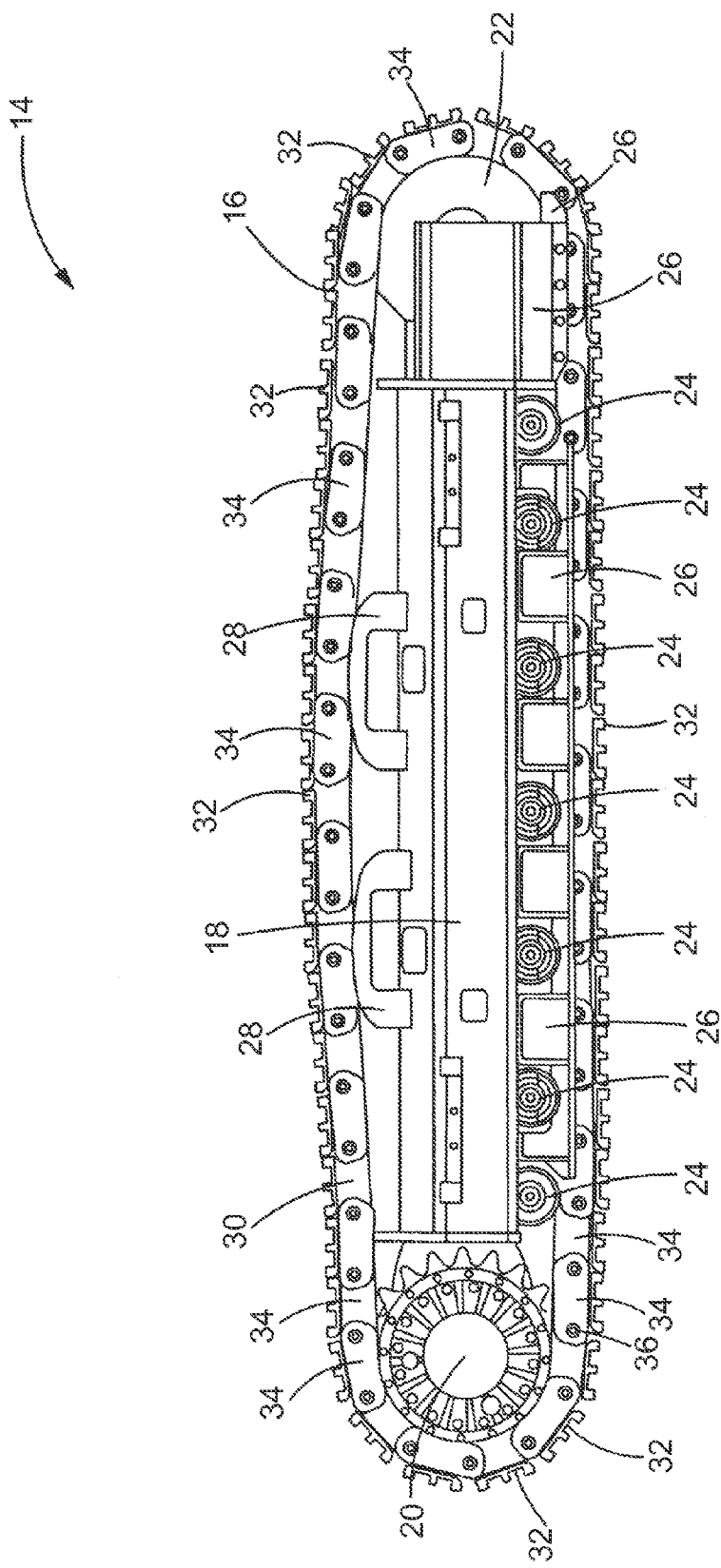
FIG. 2 is a side view of the track assembly of the machine of FIG. 1.

The undercarriage 12 supports the machine 10 and may be operable to move the machine 10 along a work surface such as the ground, roads, and other types of terrain. As shown in FIG. 2, the track assembly 14 of the undercarriage 12 may include the endless track 16, a track roller frame 18 and various guiding components supported by the track roller frame 18 that engage with and guide the endless track 16. The guiding components may include one or more drive sprockets 20, idlers 22, track roller assemblies 24, track guides 26, and carriers 28, although other components may be used.

The endless track 16 may include a link assembly 30 with a plurality of track shoes 32 secured thereto. The link assembly 30 may extend around the drive sprocket 20, roller assemblies 24, idler 22, and carriers 28. More specifically, the link assembly 30 may include a plurality of links 34 connected to one another at pivot joints 36, with each link 34 having a track shoe 32 attached thereto. Moreover, each side of each track shoe 32 of the link assembly 30 may be adjacent to and in engagement with another track shoe 32 thereby forming an endless track. The link assembly 30 may form a flexible backbone for the endless track 16 while the track shoes 32 may provide traction on the work surface on which the machine 10 is disposed and/or operating.

For clarity, only certain representative instances of the various components of track assembly 14 are identified with reference numerals in FIG. 2. Other non-numbered instances of the same components perform the same function and have the same structure as the components that do include reference numerals. As will be appreciated by those skilled in the art, the undercarriage 12, including the track assembly 14, the guiding components, the link assembly 30 and the track shoes 32 could have configurations other than that shown in FIGS. 1 and 2.

Figure 3:
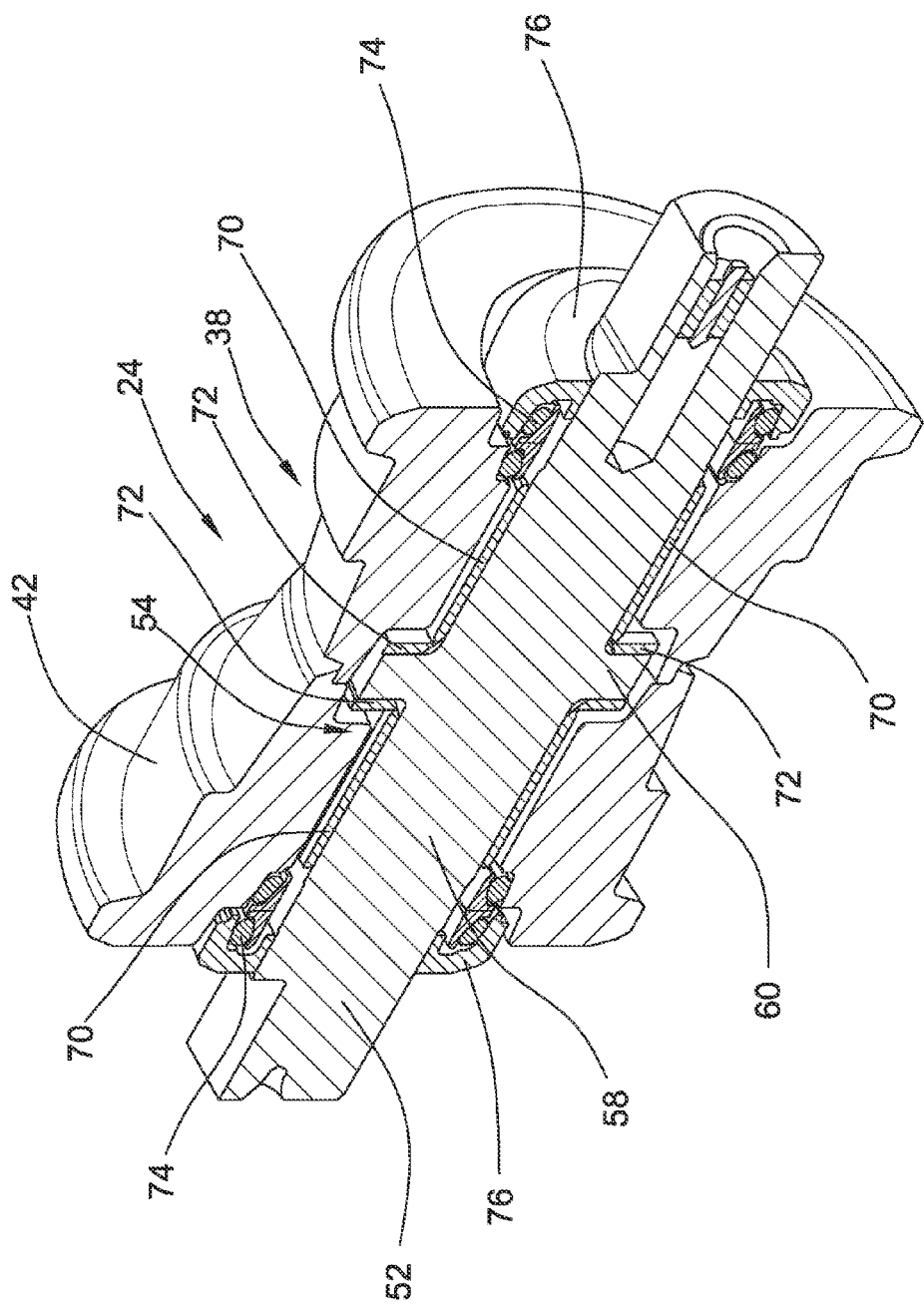
FIG. 3 is a isometric sectional view of a track roller assembly according to the present disclosure.
Figure 4:
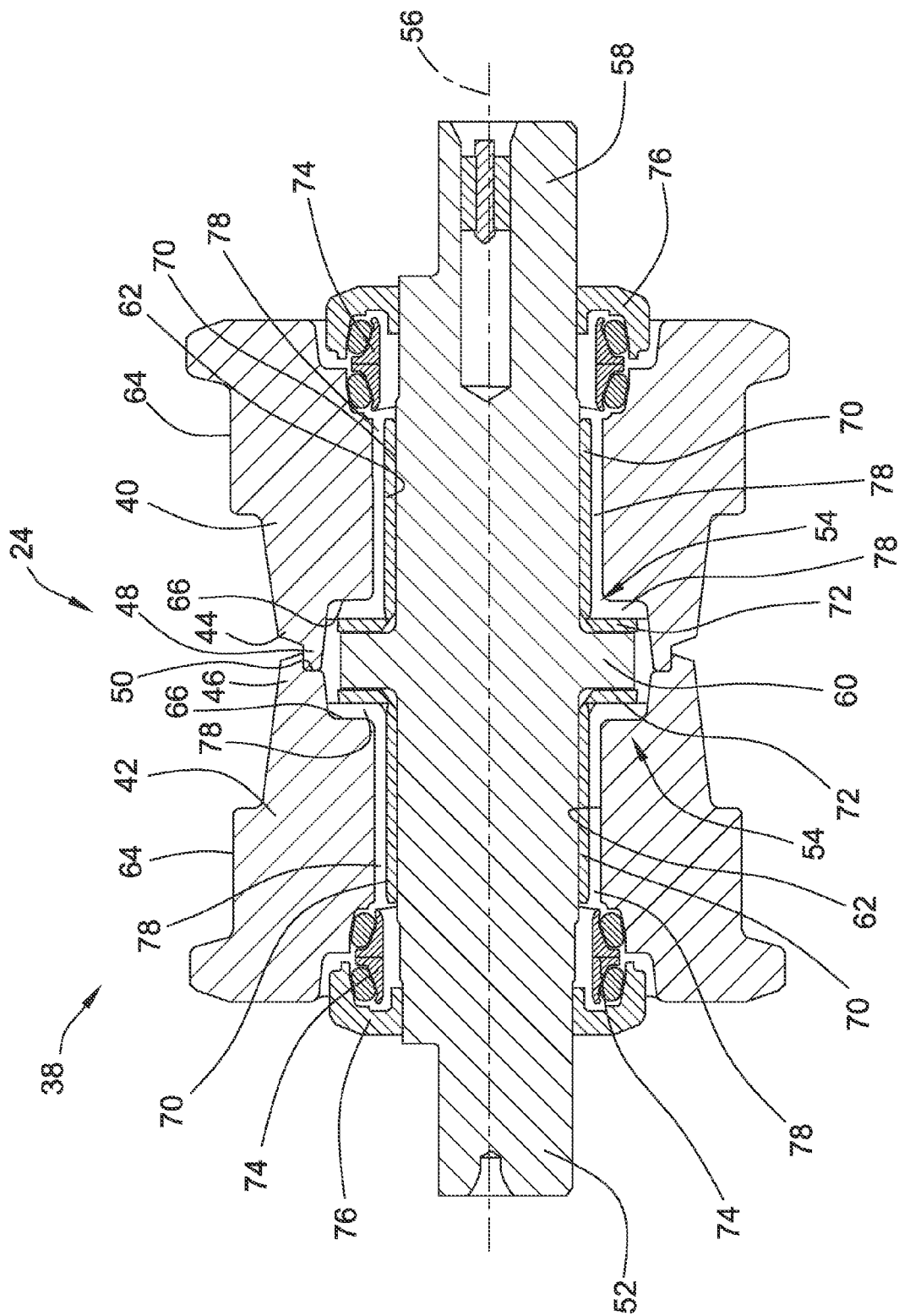
FIG. 4 is a side sectional view of the track roller assembly of FIG. 3.
Figure 7:
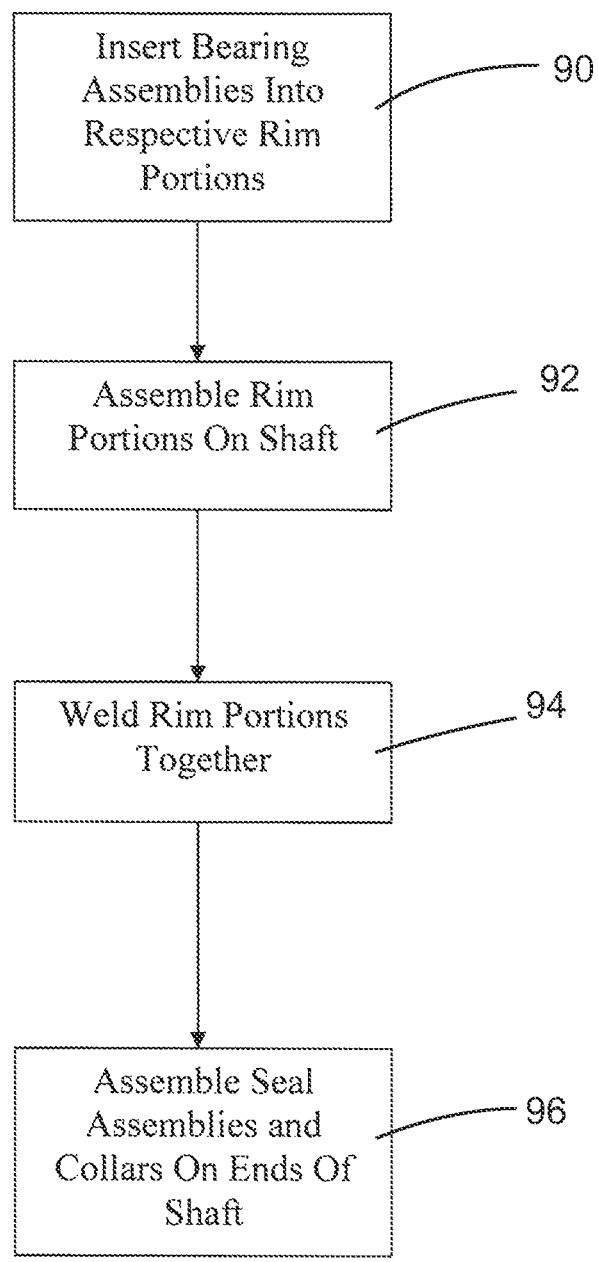
FIG. 7 is a flow chart diagram illustrating an exemplary process for assembling a track roller assembly according to the present disclosure.

Referring to FIGS. 3 and 4, isometric and side sectional views of an exemplary individual track roller assembly 24 of the track assembly 14 are provided. The section views of FIGS. 3 and 4 are taken in a plane extending in an axial direction of the track roller assembly 24. The track roller assembly 24 may include a rim assembly 38 that, in the illustrated embodiment, includes adjacent first and second rim portions 40, 42. The assembled first and second rim portions 40, 42 are shown in FIG. 5. As best shown in FIG. 4, each of the first and second rim portions 40, 42 may include a respective joint portion 44, 46 which may enable connection of the first and second rim portions 40, 42 to each other. In the illustrated embodiment, the joint portions 44, 46 extend in an axially inward direction towards each other near the center of the track roller assembly 24. To facilitate the connection of the first and second rim portions 40, 42, the joint portions 44, 46 may be configured with mating features to support welding of the first and second rim portions 40, 42 together. For example, according to one embodiment, the joint portion 44 of the first rim portion 40 may have a male configuration including a axially extending protrusion 48 while the joint portion 46 of the second rim portion 42 may have female configuration including a receptacle 50 within which the protrusion 48 may be received such as best shown in FIG. 4. Of course, the joint portions 44, 46 may have other mutually mating configurations. According to one embodiment, the first and second rim portions 40, 42 may be substantially identical except at the axial inward ends defining the joint.

As shown in FIG. 4, each of the first and second rim portions 40, 42 may surround and be rotatably supported on a shaft 52 by a respective bearing assembly 54 which is arranged between the corresponding rim portion 40, 42 and the shaft 52. The shaft 52 may define a rotational axis of the track roller assembly 24 which, in turn, corresponds to the axial direction of the track roller assembly 24. The shaft 52 may include a body portion 58 and a flange 60 that may be arranged substantially in the center of the body portion 58 of the shaft 52 at the joint between the first and second rim portions 40, 42. The flange 60 may be configured to extend in a radially outward direction relative to the body portion 58 of the shaft 52 and may help absorb axial loading on the track roller assembly 24. Each of the first and second rim portions 40, 42 may include an inner radial surface 62, which in the illustrated embodiment is configured as an annular shoulder, that faces the body portion 58 of the shaft 52 and an outer radial surface 64 which may be configured to engage with the endless track 16. Furthermore, each of the first and second rim portions 40, 42 may include an inner axial surface 66 that faces the flange 60 on the shaft 52 and an opposing outer axial surface 68. These surfaces may be configured other than as shown in FIG. 4 depending upon, for example, the size and configuration of the rim portions.

The bearing assembly 54 associated with each of the first and second rim portions 40, 42 may have a L-shaped configuration (when viewed in a cross-section taken in the axial direction) with an axially extending first leg 70 and a radially extending second leg 72 as shown in FIG. 4. In particular, the first leg 70 of each bearing assembly 54 may have a circular configuration and be disposed between the body portion 58 of the shaft 52 and the inner radial surface 62 of the respective one of the first and second rim portions 40, 42. The second leg 72 of each bearing assembly 54 may have an annular configuration and be disposed between the flange 60 on the shaft 52 and the inner axial surface 66 of the respective rim portion 40, 42. In an known manner, each of the first and second legs 70, 72 of each of the bearing assemblies 54 may include a housing that holds or contains a bearing.

To prevent debris from entering the track roller assembly 24, a seal assembly 74 may be provided at the outer axial end of each of the first and second rim portions 40, 42 as shown in FIGS. 3 and 4. The seal assembly 74 may include one or more seal elements and extend between the body portion 58 of the shaft 52 and the respective rim portion 40, 42. An annular collar 76 may be arranged on the body portion 58 of the shaft 52 axially outward of the seal assembly 74 at each end of the track roller assembly 24. The collars 76 may help retain the seal assemblies 74 and the first and second rim portions 40, 42 in their respective axial positions on the shaft 52.

To provide a lubricant, such as oil, to the bearing assemblies 54, each of the first and second rim portions 40, 42 may include a system of lubricant containment and delivery structures. According to one embodiment, these lubricant containment and delivery structures may consist of a plurality of lubricant pockets 78 provided in each of the first and second rim portions 40, 42. More specifically, as shown in FIGS. 4, 5 and 6, the lubricant pockets 78 may be provided on the inner radial surface 62 of each of the first and second rim portions 40, 42 that faces the respective bearing assembly 54, and in particular that faces the first leg 70 of the respective bearing assembly 54. FIG. 6 provides an end view of the first rim portion 40, however it will be appreciated that the second rim portion 42 may be similarly configured. In some embodiments, lubricant pockets 78 also may be provided in the inner axial surface 66 of the each of the first and second rim portions 40, 42 as shown in FIG. 4. More particularly, the lubricant pockets 78 may be provided on the portion of the inner axial surface 66 of the respective first and second rim portions 40, 42 that faces the second leg 72 of the bearing assembly 54 so as to provide lubricant at the interface between the respective second leg 72 and the corresponding one of the first and second rim portions 40, 42. These lubricant pockets 78 may be configured similarly to the lubricant pockets on the inner radial surface 62 on each of the first and second rim portions 40, 42 facing the first leg 70 of the bearing assembly 54.

Each lubricant pocket 78 may be configured to communicate with the corresponding bearing assembly 54 so as to be capable of delivering lubricant contained in the pocket to the bearing assembly 54. For example, as also shown in FIG. 4, each lubricant pocket 78 may have an open end 80 at the inner radial surface 62 of the respective rim portion 40, 42 and include a side wall 82 that extends from the open end 80 away from the inner radial surface 62 and into body of the respective rim portion 40, 42 so as to define a cavity for receiving and containing lubricant. In the illustrated embodiment, the side wall 82 of each lubricant pocket 78 has a generally semi-circular configuration when viewed from the end of the assembled first and second rim portions 40, 42 such as in FIG. 4. In other embodiments, however, the lubricant pockets 78 may have different cross-sectional configurations.

Each lubricant pocket 78 may also extend in the axial direction relative to the respective first or second rim portion 40, 42 along at least a portion of the inner radial surface 62 thereof and in the axial direction along at least a portion of the inner axial surface 66 thereof. According to one embodiment, each lubricant pocket 78 may extend along the full extent of the first leg 70 and the full extent of the second leg 72 of the respective bearing assembly 54. However, in other embodiments, each lubricant pocket 78, or a subset of the lubricant pockets, may only extend along a portion of the first leg 70 and/or a portion of the second leg 72 of the respective bearing assembly 54. Similarly, the open ends 80 of the lubricant pockets may extend the full length of the lubricant pockets 78 or the lubricant pockets 78 may be configured such that the openings that communicate with the respective bearing assembly 54 are only provided along a portion of the full axial length of the lubricant pocket 78. For example, each lubricant pocket 78 may have a plurality of axially spaced openings that communicate with the respective bearing assembly 54.

The lubricant pockets 78 may be spaced from each other in the circumferential direction on the inner radial surface 62 of each of the first and second rim portions 40, 42 as shown, for example, in FIG. 4. In the illustrated embodiment, each of the first and second rim portions 40, 42 has four lubricant pockets 78 that are spaced equidistance from each other in the circumferential direction of the respective inner radial surface 62. However, a different number of lubricant pockets 78 and/or a different circumferential spacing of the lubricant pockets 78, including an irregular spacing of the lubricant pockets 78, may be provided depending, for example, on the lubrication needs of the respective bearing assembly 54. Additionally, a plurality of lubricant pockets 78 may be provided on the inner axial surfaces 66 of the first and second rim portions 40, 42 with the individual lubricant pockets 78 being spaced from each other in the radial direction of the track roller assembly 24. Such an arrangement may allow the lubricant pockets 78 to communicate with the corresponding second leg 72 of the bearing assembly 54 at multiple locations.

INDUSTRIAL APPLICABILITY

The track assembly 14, and in particular the track roller assembly 24 of the present disclosure can be used on the tracked undercarriage of any tracked machine. The use of the lubricant pockets 78 in the first and second rim portions 40, 42 can eliminate the need for a separate bushing case surrounding the bearing assembly. Such a bushing case is provided in many track roller assembly designs. Thus, the lubricant pockets 78 allow the components of the track roller assembly 24 to be simplified and thereby also allow the cost of the track roller assembly to be reduced.

An exemplary method of assembling the track roller assembly 24 of the present disclosure is shown in the flow chart of FIG. 5. In a first step 90, a respective bearing assembly 54 is inserted, such as by press fitting, into each of the first and second rim portions 40, 42 with the first leg 70 of the bearing assembly 54 being received in the opening defined by the inner radial surface 62 of the respective first or second rim portion 40, 42 and the second leg 72 of the bearing assembly 54 abutting the inner axial surface 66 of the rim portion. Next, in step 92, each end of the body portion 58 of the shaft 52 is inserted into a respective one of the first and second rim portions 40, 42 until the second leg 72 of the respective bearing assembly 54 abuts against the flange 60 on the shaft 52.

In step 94, the first and second rim portion 40, 42 may be welded together. As noted above, this welding may be facilitated by the configurations of the joint portions 44, 46 of the first and second rim portions 40, 42. In particular, the overlap of the joint portions 44, 46 when the first and second rim portions 40, 42 are assembled together (see FIG. 3) can protect the bearing assemblies 54 and shaft 52 from being damaged by the welding process. The welding of the first and second rim portions 40, 42 can be accomplished using traditional arc welding. In another embodiment, the first and second rim portions 40, 42 can be secured together using cold metal transfer welding. After the first and second rim portions 40, 42 are welded together, the seal assemblies 74 and the collars 76 may be assembled on the ends of the shaft 52 in step 96.

This assembly process may be substantially simplified as compared, for example, to the assembly of track roller assemblies that include bushing casings surrounding the bearing assemblies. In particular, the use of the lubricant pockets enables the shaft to be assembled to the first and second rim portions before they are welded together. This simplification of the assembly process may allow the assembly process to be automated.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A track roller assembly for an endless track comprising:
a shaft including a body portion and a flange that extends in a radial direction away from the body portion, the shaft having a rotational axis that defines an axial direction;
a first rim portion and a second rim portion that are connected together;
a first bearing assembly rotatably supporting the first rim portion on the shaft, being spaced and a second bearing assembly rotatably supporting the second rim portion on the shaft, each of the first bearing assembly and the second bearing assembly includes a first leg that extends in the axial direction and is disposed along the body portion of the shaft and a second leg that extends in the radial direction and is disposed along the flange; and
wherein a respective inner surface of each of the first rim portion and the second rim portion that faces the bearing assembly includes a plurality of lubricant pockets for receiving lubricant, each of the lubricant pockets being configured and arranged such that lubricant contained therein is in fluid communication with the bearing assembly and the inner surface of each of the first and second rim portions that includes the lubricant pockets is an inner radial surface that faces the first leg of the respective bearing assembly and the lubricant pockets are spaced away from each other in a circumferential direction of the respective inner surface and extend uninterrupted along the axial direction.

2. The track roller assembly of claim 1 wherein the lubricant pockets are spaced equidistance from each other in the circumferential direction of the respective inner radial surface.

3. The track roller assembly of claim 1 wherein each lubricant pocket includes an opening at the respective inner surface and a side wall that extends into the respective rim portion to define a cavity that communicates with the opening.

4. The track roller assembly of claim 1 further including a first seal assembly extending between the shaft and the first rim portion at a first outer axial end of the first rim portion and a second seal assembly extending between the shaft and the second rim portion at a second outer axial end of the second rim portion.

5. The track roller assembly of claim 4 further including a first collar arranged on the shaft axially outward of the first seal assembly and a second collar arranged on the shaft axially outward of the second seal assembly.

6. The track roller assembly of claim 1 wherein the first and second rim portions are connected together at a joint that includes a protrusion arranged on the first rim portion and a receptacle on the second rim portion in which the protrusion is received.

7. The track roller assembly of claim 1 wherein the inner surface of each of the first and second rim portions that includes the lubricant pockets is an inner axial surface that faces the second leg of the respective bearing assembly.

8. A track assembly comprising:
a track roller frame;
an endless track; and
a track roller assembly supported on the track roller frame for guiding the endless track, the track roller assembly comprising:
a shaft including a body portion and a flange that extends in a radial direction away from the body portion, the shaft having a rotational axis defining an axial direction;
a first rim portion and a second rim portion that are connected together; and
a first bearing assembly rotatably supporting the first rim portion on the shaft and a second bearing assembly rotatably supporting the second rim portion on the shaft, each of the first bearing assembly and the second bearing assembly includes a first leg that extends in the axial direction and is disposed along the body portion of the shaft and a second leg that extends in the radial direction and is disposed along the flange; and
wherein a respective inner surface of each of the first rim portion and the second rim portion that faces the bearing assembly includes a plurality of lubricant pockets for receiving lubricant, each of the lubricant pockets being configured and arranged such that lubricant contained therein is in fluid communication with the bearing assembly and wherein the inner surface of each of the first and second rim portions that includes the lubricant pockets is an inner radial surface that faces the first leg of the respective bearing assembly and the lubricant pockets are spaced from each other in a circumferential direction of the respective inner surface and extend continuously in the axial direction.

9. The track assembly of claim 8 wherein the lubricant pockets are spaced equidistance from each other in the circumferential direction of the respective inner radial surface.

10. The track assembly of claim 8 further including a first seal assembly extending between the shaft and the first rim portion at a first outer axial end of the first rim portion and a second seal assembly extending between the shaft and the second rim portion at a second outer axial end of the second rim portion.

11. The track assembly of claim 10 further including a first collar arranged on the shaft axially outward of the first seal assembly and a second collar arranged on the shaft axially outward of the second seal assembly.

12. The track assembly of claim 8 wherein the first and second rim portions are connected together at a joint that includes a protrusion arranged on the first rim portion and a receptacle on the second rim portion in which the protrusion is received.

13. The track assembly of claim 8 wherein the inner surface of each of the first and second rim portions that includes the lubricant pockets is an inner axial surface that faces the second leg of the respective bearing assembly.

\* \* \* \* \*